United States Patent [19]

Zahir et al.

[11] 4,100,140

[45] Jul. 11, 1978

[54] PROCESS FOR THE MANUFACTURE OF CROSSLINKED POLYMERS WHICH CONTAIN IMIDE GROUPS

[75] Inventors: Sheik Abdul-Cader Zahir, Oberwil; Alfred Renner, Münchenstein, both of Switzerland

[73] Assignee: Ciba-Geigy Corporation, Ardsley, N.Y.

[21] Appl. No.: 697,791

[22] Filed: Jun. 18, 1976

[30] Foreign Application Priority Data

Jun. 19, 1975 [CH] Switzerland .................. 7988/75

[51] Int. Cl.$^2$ .............................................. C08G 73/12
[52] U.S. Cl. ................................... 526/90; 260/37 N; 428/474; 526/258; 521/18 D; 526/89; 526/173; 526/204; 526/205; 526/217; 526/218; 526/212; 526/220; 526/230; 526/262; 526/277; 526/288; 526/313

[58] Field of Search ................ 526/258; 260/47 UA, 260/49, 47 CZ, 47 CP, 47 P, 2.5 N

[56] References Cited

U.S. PATENT DOCUMENTS

| | | | |
|---|---|---|---|
| 3,471,458 | 10/1969 | Mehmedbasich | 526/528 |
| 4,008,186 | 2/1977 | Scaggs | 526/528 |

*Primary Examiner*—Lester L. Lee
*Attorney, Agent, or Firm*—Luther A. R. Hall

[57] ABSTRACT

The invention relates to the manufacture of crosslinked polymers which contain imide groups by reacting polymaleimides with alkenylphenols or alkenylphenol ethers, preferably at temperatures of 100° to 250° C. The reaction mixture optionally also contains polymerization catalysts. The manufacture of the polymers is as a rule carried out with simultaneous shaping. Shaped articles (for example castings), laminates, adhesive bonds and foams can be manufactured in this way. It is also possible to carry out the reaction in solution.

34 Claims, No Drawings

PROCESS FOR THE MANUFACTURE OF CROSSLINKED POLYMERS WHICH CONTAIN IMIDE GROUPS

It is known that polymaleimides can be used as raw materials for the manufacture of polyaddition products and polymerization products. Thus, for example, the polyaddition reaction of N,N'-bis-maleimides with primary diamines and the curing of these pre-adducts by polymerisation by the action of heat are described in French Pat. No. 1,555,564.

However, this manufacturing process is not suitable for the production of complex castings, especially when structural elements are embedded in the castings, since the starting mixtures have to be heated in order to obtain a sufficiently low viscosity and the processing times are greatly shortened as a result.

Polyaddition products of bis-maleimides and organic dithiols are claimed in U.S. Pat. No. 3,741,942. It is noticeable that the examples are restricted to those polymers which have been manufactured by a polyaddition reaction of aliphatic dithiols with the maleimides. These known polyadducts and the process for their manufacture display all the great disadvantages which are characteristic of polymers which contain sulphur. Particular mention should be made of the highly troublesome odour resulting from the dithiols and of the toxic action thereof. Since analogous troublesome effects also arise when these sulphur-containing polyadducts are burnt and decomposed at a high temperature, it is in most cases not possible to employ the said polyadducts as materials, especially in the building trade and in vehicle and aircraft construction.

Heat-curable compositions of bis-maleimides, polyamines and allyl esters are claimed in DT-OS No. 2,131,735. Apparently, the allyl esters, especially allyl phthalate, are added in order to lower the viscosity of the starting mixtures. However, as a result mixtures are obtained which, because their processing time is too short, are not so suitable for the manufacture of complex castings, for filling cavities and cracks and for embedding articles in so-called dead moulds. Moreover, it was possible to show that polymers which had been obtained by the reaction of bis-maleimides with allyl phthalate alone gave poor results in the high temperature test (270° C).

The object of the invention is to provide polymers which contain imide groups and are based on polymaleimides, which do not exhibit the disadvantages of the polyadducts based on polymaleimide, which were known hitherto, and which can be manufactured without handling noxious substances and without producing troublesome odours. The reaction mixtures for the manufacture of these polymers should be of lower viscosity than the starting mixtures for the manufacture of the polymers of the state of the art. The processing time (that is to say the pot life at the processing temperature) should, at the same time, be longer, so that it is possible to manufacture even complex castings and also to fill cavities and narrow cracks.

The subject of the invention is a process for the manufacture of crosslinked polymers containing imide groups, which is characterised in that polyimides which contain, per molecule, at least two radicals of the general formula

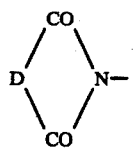

in which D denotes a divalent radical containing a carboncarbon double bond, are reacted with alkenylphenols and/or alkenylphenol ethers, optionally in the presence of polymerisation catalysts.

In most cases the reaction according to the invention is carried out at temperatures of 20° to 250° C and preferably of 100° to 250° C and using a ratio such that there are 0.1 to 10, preferably 0.25 to 1.0, mols of alkenylphenol and/or alkenylphenol ether per 1 equivalent of polyimide.

According to the invention, the reaction can also be carried out in the presence of phenols, such as, for example, carbolic acid, cresol and bisphenol A. That is to say industrial alkenylphenols, and the corresponding ethers, which still contain residues of the phenols used as the starting materials, can also be employed for the reaction according to the invention.

Most of the polyimides to be employed according to the invention are described in detail in the literature. They can be manufactured by the methods described in U.S. Pat. No. 3,010,290 and in British Patent Specification No. 1,137,592, by reacting the corresponding diamines with unsaturated dicarboxylic acid anhydrides.

According to the invention it is possible to employ, inter alia, all the polyimides which have already been listed in French Pat. No. 1,555,564. Maleimides, that is to say polyimides of the formula (I), which contain radicals in which D denotes the divalent radical of the formula

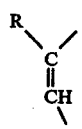

in which R represents hydrogen or methyl, are particularly suitable.

The reaction with polyimides which contain, per molecule, two or three radicals of the formula (I), and thus, in particular, the reaction with bis-maleimides and trismaleimides, is a preferred embodiment of the invention.

Particularly suitable bis-maleimides which may be mentioned are compounds of the formula

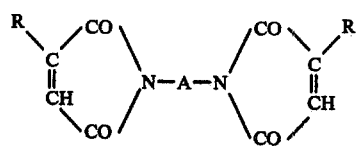

in which A denotes a divalent organic radical with 2 to 30 C atoms.

The radical A in formula (III) preferably corresponds to the formula

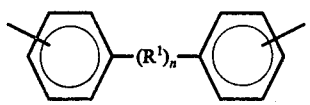 (IV)

in which $R^1$ represents one of the radicals —$CH_2$—,

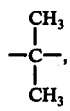

$SO_2$—, —SO—, —S— and —O— and $n$ is 0 or 1.

The substances which follow may be mentioned as specific examples of known polyimides which are suitable for the process according to the invention: N,N'-ethylene-bis-maleimide, N,N'-hexamethylene-bis-maleimide, N,N,'-m-phenylene-bis-maleimide, N,N'-p-phenylene-bis-maleimide, N,N'-4,4'-diphenylmethane-bis-maleimide (this is preferably employed), N,N'-4,4'-3,3'-dichloro-diphenylmethane-bis-maleimide, N,N'-4,4'-(diphenyl ether)-bis-maleimide, N,N'-4,4'-diphenyl-sulphone-bis-maleimide, N,N'-4,4'-dicyclohexylmethane-bis-maleimide, N,N'-α,α'-4,4'-dimethylenecyclohexane-bis-maleimide, N,N'-m-xylylene-bis-maleimide, N,N'-p-xylylene-bis-maleimide, N,N'-4,4'-diphenylcyclohexane-bis-maleimide, N,N'-m-phenylene-bis-citraconimide, N,N'-4,4'-diphenylmethane-bis-citraconimide, N,N'-4,4'-2,2-diphenylpropane-bis-maleimide, N,N'-γ,γ'-1,3-dipropylene-5,5-dimethyl-hydantoin-bis-maleimide, N,N'-4,4'-diphenylmethane-bis-itaconimide, N,N'-p-phenylene-bis-itaconimide, N,N'-4,4'-diphenylmethane-bis-dimethylmaleimide, N,N'-4,4'-2,2-diphenylpropane-bis-dimethylmaleimide, N,N'-hexamethylene-bis-dimethylmaleimide, N,N'-4,4'-(diphenyl ether)-bis-dimethylmaleimide and N,N'-4,4'-diphenylsulphone-bis-dimethylmaleimide.

However, it is also possible to employ bis-imides and tris-imides which have the following formula VII

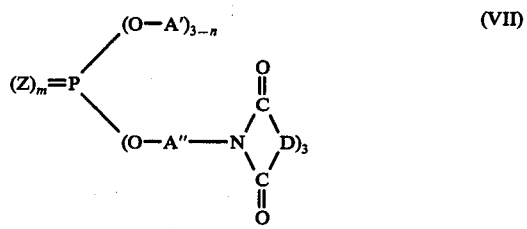 (VII)

for the process according to the invention. In this formula A' and A" denote optionally substituted aromatic radicals or aromatic radicals which are interrupted by an oxygen atom, an alkylene group or a sulphonyl group, D denotes the radical already defined above, Z denotes an oxygen atom or sulphur atom, $m$ denotes the number 1 or 0 and $n$ denotes the number 2 or 3.

In this connection attention should be drawn to DT-OS No. 2,350,471.

Examples of such maleimides which are suitable for the process according to the invention are: the N,N'-bis-maleimide of 4,4'-diamino-triphenyl phosphate, the N,N'-bis-maleimide of 4,4'-diamino-triphenyl thiophosphate, the N,N',N"-tris-maleimide of tris-(4-aminophenyl) phosphate and the N,N', N"-tris-maleimide of tris-(4-aminophenyl) thiophosphate.

According to the invention it is also possible to use mixtures of two or more of all of the abovementioned polyimides. Mixtures of polyimides with monoimides containing the radical of the formula I can also be employed according to the invention.

According to the invention, allylphenols and methallylphenols, or the ethers thereof, are preferably employed as the alkenylphenols or alkenylphenol ethers. Both mononuclear and polynuclear, preferably binuclear, alkenylphenols and alkenylphenol ethers can be employed. Preferably, at least one nucleus contains both an alkenyl group and a phenolic, optionally etherified OH group.

As is known, alkenylphenols are manufactured by rearrangement of the alkenyl ethers of phenols (for example of the allyl ether of phenol) by the action of heat (Claisen rearrangement). These alkenyl ethers are also obtained according to known processes by reacting phenols and, for example, allyl chloride in the presence of an alkali metal hydroxide and solvents. As is known, a condensation reaction takes place (elimination of an alkali metal chloride).

A typical binuclear alkenylphenol which can be employed according to the invention is an alkenylphenol of the formula V

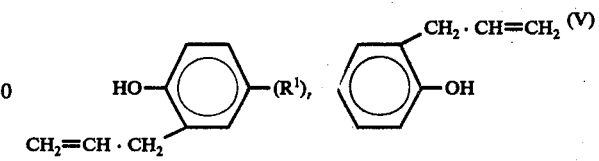 (V)

in which $R^1$ and $n$ have the above meaning.

According to the invention, the use of mixtures of polynuclear alkenylphenols and/or alkenylphenol ethers with mononuclear alkenylphenols and/or alkenylphenol ethers also gives good results. The alkenylphenol ethers preferably empolyed are those substances which contain one or more molecular radicals of the formula VI

—O—$R^2$ (VI)

in which $R^2$ denotes an alkyl radical with 1 to 10 C atoms, an aryl radical or an alkenyl radical, preferably allyl or methallyl, the O atom in formula VI representing the phenolic ether bridge.

A further embodiment of the invention in the use of mixtures of those substances which contain only one OH group and only one alkenyl group on the aromatic nucleus with substances which contain several OH groups and/or several alkenyl groups on the aromatic nucleus, or of mixtures of the corresponding phenol ethers of these substances.

The substances which follow can be listed as examples of alkenylphenols which can be employed for the process according to the invention: o,o'-diallyl-bis-phenol A, 4,4'-hydroxy-3,3'-allyl-diphenyl, bis-(4-hydroxy-3-allylphenyl)-methane, 2,2-bis-(4-hydroxy-3,5-diallyl-phenyl)-propane and eugenol.

The corresponding methallyl compounds can also be used. In place of the said alkenylphenols it is also possible to use the corresponding ethers of these phenols, especially the methyl ethers.

Polymerisation catalysts which can be employed according to the invention are ionic and free-radical catalysts. They should be present in the reaction mixture in a concentration of 0.1 to 10% by weight, preferably of 0.1 to 5% by weight, based on the total amount of the reactants.

Amongst the ionic catalysts, those which are suitable according to the invention are, in particular, tertiary, secondary and primary amines or amines which contain several amino groups of different types (for example mixed tertiary/secondary amines) and quaternary ammonium compounds. These amine catalysts can be either monoamines or polyamines. When primary and secondary amines are used, monoamines are to be preferred. The substances which follow are to be listed as examples of such amine catalysts: diethylamine, tributylamine, triethylamine, triamylamine, benzylamine, tetramethyldiaminodiphenylmethane, N,N-diisobutylaminoacetonitrile, N,N-dibutylaminoacetonitrile, heterocyclic bases, such as quinoline, N-methylpyrrolidine, imidazole, benzimidazole and their homologues, and also mercaptobenzothiazole. Examples of suitable quaternary ammonium compounds which may be mentioned are benzyltrimethylammonium hydroxide and benzyltrimethylammonium methoxide.

Further suitable ionic catalysts are alkali metal compounds, such as alkali metal alcoholates and alkali metal hydroxides. Sodium methylate is particularly suitable.

Suitable free-radical polymerization catalysts are the known organic peroxides and hydroperoxides as well as azoisobutyronitrile. In this case also, the preferred concentration is 0.1 to 5.0% by weight.

Further polymerisation catalysts which can be employed for the process according to the invention are acetyl-acetonates, especially the acetyl-acetonates of the transistion metals. The corresponding vanadium compound is to be singled out in particular. These special polymerization catalysts are also employed in the concentration already mentioned above.

The reaction according to the invention is preferably carried out in the melt, or partly in the melt and partly in the solid phase. However, it can also be carried out in solution. In most cases, however, the addition of solvents can be dispensed with because the starting mixtures as such are already of sufficiently low viscosity even at medium temperatures (for example at 120° C).

When the process is carried out in the melt, temperatures of 100° to 250° C are particularly suitable.

The following substances can be listed as examples of suitable solvents: chloroform, dioxane, tetrahydrofurane, dimethylformamide, tetramethylurea and N-methylpyrrolidone.

The process according to the invention can also be carried out in two stages, in the following manner. After all of the starting materials have been mixed, and optionally after subsequent grinding of the mixture, the powder or the liquid is first heated for a limited time to, preferably, 120°–170° C. A product which can still be moulded by the action of heat and, in some cases, is soluble is formed. If necessary, this prepolymer must be ground again to give a powder which can be processed, before it is finally cured during final processing. The pre-polymerisation can also be carried out by heating a solution or suspension of the starting materials.

As a rule, the manufacture, according to the invention, of the crosslinked polymers containing imide groups is carried out with simultaneous shaping to give shaped articles, sheet-like structures, laminates, adhesive bonds or foams. The additives customary in the technology of curable plastics, such as fillers, plasticisers, pigments, dyestuffs, mould-release agents and flame-retarding substances, can be added to the curable compositions. Examples of fillers which can be used are glass fibres, mica, graphite, ground quartz, kaolin, colloidal silica or metal powders and examples of mould-release agents which can be used are silicone oil, various waxes, zinc stearate or calcium stearate and the like.

Shaping of the product which can be manufactured by the process according to the invention can be effected in an extremely simple manner by the casting process using a casting mould.

However, shaping can also be carried out by hot press moulding using a press. Usually it suffices when the product is heated only briefly to temperatures of 170° to 250° C under a pressure of 1 to 200 kp/cm$^2$ and the moulding, thus obtained, is fully cured outside the press.

The process according to the invention and the polyaddition products which can be manufactured by means of this process can be used, above all, in the fields of the manufacture of castings, surface protection, electrical engineering, laminating processes, adhesives and the manufactures of foams and in the building trade.

The invention also relates to mixtures which can be cured by the action of heat and are stable on storage and which are characterised in that they contain a) polyimides, which contain, per molecule, at least two radicals of the general formula

(I)

in which D denotes a divalent radical which contains a carboncarbon double bond, and b) alkenylphenols and/or alkenylphenol ethers. According to a preferred embodiment, these mixtures contain polymerisation catalysts.

The mixtures according to the invention are preferably used as casting resins.

Manufacture of Starting Materials for the Process According to the Invention

I. Manufacture of o,o'-diallyl-bisphenol A

Bisphenol A (228 g), NaOH (82.5 g) and n-propanol (1 liter) are heated under reflux. After everything has gone into solution, 200 ml of allyl chloride are added slowly. After three hours, the mixture is virtually neutral. It is stirred for a further three hours, whilst boiling under reflux. After cooling to room temperature, the NaCl which has precipitated is filtered off and the n-propanol is distilled off. The crude diallyl ether of bisphenol A (308 g) which is thus obtained is taken up in methylene chloride and washed with water. After separating off the aqueous phase, the methylene chloride is distilled off again. The resulting pure diallyl ether of bisphenol A is dried over sodium sulphate.

The diallyl ether of bisphenol A is subjected to a Claisen rearrangement, at 200° to 205° C and using the monoether of diethylene glycol as the solvent (approximately 50% strength solution), to give o,o'-diallyl-bisphenol A. The product is then purified by means of a rotary evaporator and subsequently by vacuum distillation (boiling point 190° C/0.5 mm Hg). The yield of o,o'-diallyl-bisphenol A is 85%. The structures of both the intermediate product and the end product were confirmed by means of microanalysis, gas chromatography, gel permeation chromatography and NMR and IR spectroscopy.

ILLUSTRATIVE EXAMPLES

EXAMPLE 1

358 g of 4,4'-bis-maleimidodiphenylmethane (BMDM) and 308 g of o,o'-diallyl-bisphenol A (DABA) are placed in a round-bottom flask. After the flask has been connected to a rotary evaporator, the mixture is heated to 120° to 150° C by means of an oil bath. A melt forms. The latter is degassed in vacuo (15 mm Hg). Air is then allowed into the flask and the melt is poured into moulds preheated to 150° C. The mixture is heated in an oven, in a first stage to 150° C for 6 hours and in a 2nd stage to 250° C for 12 hours. After cooling slowly, excellent castings are obtained. The physical, mechanical and electrical properties are summarized in Table 2.

EXAMPLES 2 to 21

(a) Manufacture of the products

The procedure is according to Example 1 but different products or different amounts are employed in each case. In some cases a polymerisation catalyst is employed and in some cases the polymerisation is carried out without a catalyst. The catalyst is always added only after the reaction mixture has been degassed. After the catalyst has dissolved, the mixture is once again degassed briefly. The conditions for the individual examples are summarised in Table 1. The conditions for Example 1 are also given in this table. In addition, the viscosity of the molten starting mixture at 100° C after degassing is indicated in some cases.

(b) Mechanical and physical properties of the polymers

The test values for the polymers manufactured according to a) are summarized in Table 2. In each case two results are given and these are a test value for the product which has not been aged and a further test value for a test specimen heated to 270° C for 10 hours.

The following test methods were used:

| | |
|---|---|
| heat distortion point | ISO/R-75* |
| flexural strength | VSM 77,103** |
| impact strength | VSM 77,105 |
| absorption of cold water (4 days at 23° C) | DIN 53,495 |
| absorption of water at 100° C (1 hour at 100° C) | DIN 53,471 |
| dielectric loss factor tan δ dielectric constant ε | 80 cm$^2$; 50 Hz actual voltage 1,000 V C$_n$ 100 pf DIN 53,483 |
| specific resistance | DIN 53,482 |

*ISO/R = standards of the International Standard Organisation/Recommendation
**VSM = standards of the Verein Schweizerischer Maschinenindustrieller (Association of Swiss Machine Manufacturers)

Loss in weight at 270° C

A sample with dimensions of $60 \times 10 \times 4$ mm is stored for 10 days at 270° C in a drying cabinet and the loss in weight of the test specimen is determined.

EXAMPLE 22

Manufacture and processing of laminates 1.0 mol of N,N'-4,4'-diphenylmethane-bis-maleimide and 1.0 mol of o,o'-diallyl-bisphenol A are melted at 120° C. The melt is used, without further additions of solvent, to impregnate a glass fabric which has a weight per m$^2$ of 280 g and a satin weave and which contains, as the adhesion promoter, a chromium-III methacrylate complex ("Volan A", trademark of Messrs. Du Pont). For this purpose the glass fabric is impregnated by dipping. In order to achieve advantageous flow characteristics on subsequent compression moulding, the resulting impregnated fabric web is then prereacted for 8 minutes at a temperature of 180° C in a circulating air oven and is then cut and, stacked to form bundles (of 15 plies) for compression moulding, subjected to compression moulding in a platen press at 180° C between two high gloss copper foils. The press is first kept under a light contact pressure for 2 minutes and the pressure is then increased to 20 kp/cm$^2$. The preliminary reaction in the drying cabinet can be avoided by using a correspondingly longer contact time in the press.

After one hour the test specimen is taken out of the press and post-cured for a further 6 hours at 240° C in the oven. A tough, heat-resistant laminate of high mechanical performance is obtained.

Table 1

| | Polyimmide employed | | | Alkenylphenol (or alkanyl-phenol ether) employed | | | Catalyst employed | | | Initial viscosity of the melt after degassling at 100 ° C |
|---|---|---|---|---|---|---|---|---|---|---|
| Ex. | Type | Amount g | mol | Type | Amount g | mol | Type | Amount g | % by wt. | cP |
| 1 | BMDM | 358 | 1 | DABA | 308 | 1 | — | — | — | 314 |
| 2 | BMDM | 358 | 1 | DABA | 308 | 1 | 2-phenylimidazole | 1 | 952 | |
| 3 | BMDM | 358 | 1 | DABA | 308 | 1 | N,N'-diallyl-melamine | | 0.5 | 2,066 |
| 4 | BMDM | 358 | 1 | DABA | 308 | 1 | vanadium acetyl-acetonate | | 0.25 | — |
| 5 | BMDM | 358 | 1 | DABA | 308 | 1 | N,N'-tetramethyl-aminodiphenyl methane | 1 | 887 | |
| 6 | BMDM | 358 | 1 | DABA | 308 | 1 | N,N'-diallyl-melamine | | 1 | — |
| 7 | BMDM | 358 | 1 | DABA | 268.5 | 0.87 | — | — | — | 827 |
| 8 | BMDM | 358 | 1 | DABA | 268.5 | 0.87 | 2-phenylimidazole | | 1 | — |
| 9 | BMDM | 358 | 1 | DABA | 231.6 | 0.75 | 2-phenylimidazole | | 1 | — |
| 10 | BMDM | 358 | 1 | DABA | 231 | 0.75 | N,N'-tetramethyl-aminodiphenyl-methane | | 0.5 | 1,862 |
| 11 | BMDM | 358 | 1 | DABA | 154 | 0.5 | — | — | — | 844 |
| 12 | BMDM | 358 | 1 | DABA | 154 | 0.5 | 2-phenylimidazole | | 1 | |

Table 1-continued

| | Polyimmide employed | | | Alkenylphenol (or alkanyl-phenol ether) employed | | | Catalyst employed | | | Initial viscosity of the melt after degassling at 100° C cP |
|---|---|---|---|---|---|---|---|---|---|---|
| Ex. | Type | Amount g | mol | Type | Amount g | mol | Type | g | % by wt. | |
| 13 | BMDM | 358 | 1 | DABA | 154 | 0.5 | N,N'-tetramethyl-aminodiphenyl-methane | | 1 | — |
| 14 | BMDM | 358 | 1 | DABA | 77 | 0.25 | — | — | — | — |
| 15 | N,N'-m-phenylene-bis-maleimide | 268 | 1 | DABA | 536 | 1.74 | — | — | — | — |
| 16 | N,N'-m-phenylene-bis-maleimide | 268 | 1 | DABA | 365.5 | 1.19 | — | — | — | — |
| 17 | BMDM | 358 | 1 | eugenol methyl ether | 178 | 1 | — | — | — | — |
| 18 | BMDM | 358 | 1 | eugenol | 164 | 1 | — | — | — | — |
| 19 | BMDM | 358 | 1 | o,o'-tetraallyl-bisphenol A | 388 | 1 | — | — | — | — |
| 20 | BMDM | 358 | 1 | o,o'-diallyl-p,p'-dihydroxy-diphenylmethane | 282 | 1 | — | — | — | — |
| 21 | BMDM | 358 | 1 | " | 141 | 0.5 | — | — | — | — |

Table 2

| Ex. | Ageing | Loss in weight on ageing % by wt. | Heat distortion point °C | Flexural strength kg/mm² | Impact strength cmkg/cm² | Absorption of cold water % by wt. | Absorption of hot water % by wt. | Dielectric loss factor tan δ · 10² at 250° C | Dielectric constant ε at 250° C | Specific resistance Ω · 10⁻¹² |
|---|---|---|---|---|---|---|---|---|---|---|
| 1 | not aged | | 292 | 15.6 | 17.7 | 1.12 | 0.66 | 0.42 | 3.3 | 14 |
| | 10 hrs 270° C | 2.69 | >300 | 12.05 | 14.4 | 1.97 | 1.16 | 0.22 | 3.2 | 49 |
| 2 | not aged | | 270 | 12.91 | 11.6 | 0.89 | 0.58 | 0.73 | 3.5 | 2.2 |
| | 10 hrs 270° C | 2.61 | >300 | 12.31 | 17.72 | 1.16 | 0.77 | 0.33 | 3.3 | 22 |
| 3 | not aged | | 278 | 13.17 | 14.30 | 1.05 | 0.57 | 1.5* | 3.6* | 2.4* |
| | 10 hrs 270° C | 2.56 | >300 | 12.79 | 11.60 | 1.81 | 1.18 | 0.29* | 3.4* | 32* |
| 4 | not aged | | 286 | 14.08 | 13.40 | 1.22 | 0.70 | 0.78 | 3.4 | 4.4 |
| | 10 hrs 270° C | — | — | 10.91 | — | — | — | 0.39 | 3.2 | 17 |
| 5 | not aged | | 297 | 11.80 | 12.4 | 0.94 | 0.47 | 0.88 | 3.4 | 3.7 |
| | 10 hrs 270° C | 2.44 | >300 | 12.45 | 12.5 | 1.56 | 0.99 | 0.52 | 3.3 | 12 |
| 6 | not aged | | 284 | 10.95 | 12.9 | 0.89 | 0.55 | — | — | — |
| | 10 hrs 270° C | 2.38 | >300 | 11.39 | 13.3 | 1.35 | — | — | — | — |
| 7 | not aged | | 291 | 14.56 | 14.85 | 1.19 | 0.70 | 0.33 | 3.3 | 22 |
| | 10 hrs 270° C | 2.86 | >300 | 13.68 | 12.5 | 2.28 | 1.28 | 0.17 | 3.2 | 26 |
| 8 | not aged | | >300 | 13.08 | 11.0 | 1.05 | 0.67 | 1.13 | 3.4 | 6.5 |
| | 10 hrs 270° C | 2.48 | >300 | 13.55 | 14.2 | 1.59 | 1.04 | 0.43 | 3.3 | 45 |
| 9 | not aged | | >300 | 14.04 | 13.5 | 0.99 | 0.46 | 0.68 | 3.4 | 5.4 |
| 9 | 10 hrs 270° C | 2.63 | >300 | 12.35 | 10.0 | 1.77 | 1.05 | 0.36 | 3.2 | 18 |
| 10 | not aged | | >300 | 13.06 | 14.3 | 1.47 | 0.69 | 0.61 | 3.3 | 9.3 |
| | 10 hrs 270° C | 2.40 | >300 | 12.5 | 9.7 | 2.15 | 1.29 | 0.31 | 3.2 | 35 |
| 11 | not aged | | >300 | 15.04 | 20.2 | 1.65 | 0.84 | 0.18 | 3.2 | 48 |
| | 10 hrs 270° C | 3.04 | >300 | 12.57 | 11.22 | 3.13 | 1.62 | 0.15 | 3.2 | 170 |
| 12 | not aged | | >300 | 13.30 | 12.25 | 1.33 | 0.77 | 0.80 | 3.3 | 7.8 |
| | 10 hrs 270° C | 2.91 | >300 | 11.78 | 11.28 | 1.41 | 2.55 | 0.33 | 3.3 | 54 |
| 13 | not aged | | >300 | 12.03 | 10.5 | 1.45 | 0.61 | 0.50 | 3.3 | 8.2 |
| | 10 hrs 270° C | 2.93 | >300 | 10.01 | 7.8 | 2.51 | 1.34 | 0.28 | 3.2 | 30 |
| 14 | not aged | | >300 | 9.30 | 12.4 | 1.65 | 0.66 | 0.56 | 3.3 | 6.2 |
| | 10 hrs | 3.66 | >300 | 7.34 | 4.1 | 4.43 | 1.92 | 0.14 | 3.1 | 67 |

Table 2-continued

| Ex. | Ageing | Loss in weight on ageing % by wt. | Heat distortion point °C | Flexural strength kg/mm² | Impact strength cmkg/cm² | Absorption of cold water % by wt. | Absorption of hot water % by wt. | Dielectric loss factor tan δ . 10² at 250° C | Dielectric constant ε at 250° C | Specific resistance Ω .10⁻¹² |
|---|---|---|---|---|---|---|---|---|---|---|
| 15 | not aged | | 291 | 12.11 | 10.5 | 0.92 | 0.51 | 0.97 | 3.8 | 4.3 |
|  | 10 hrs 270° C | 2.33 | >300 | 11.47 | 6.3 | 1.46 | 1.04 | 0.32 | 3.1 | 39 |
| 16 | not aged | | >300 | 13.2 | 11.9 | 1.09 | 0.55 | 0.40 | 3.3 | 12 |
|  | 10 hrs 270° C | 2.28 | >300 | 11.28 | 6.5 | 1.74 | 1.08 | 0.30 | 3.2 | 31 |
| 17 | not aged | | 267 | 9.35 | 6.3 | 1.84 | 1.05 | 3.87 | 3.6 | 0.13 |
|  | 10 hrs 270° C | 3.43 | 243 | 11.71 | 14.1 | 2.54 | 1.46 | 2.47 | 3.4 | 2.4 |
| 18 | not aged | | 263 | 14.4 | 9.0 | 1.41 | 0.90 | 4.36 | 3.7 | 0.66 |
|  | 10 hrs 270° C | 3,90 | 262 | 13.38 | 15.7 | 2.24 | 1.40 | 0.90 | 3.5 | 4.0 |
| 19 | not aged | | >300 | 9.17 | 5.6 | 1.68 | 0.78 | 0.56 | 3.1 | 3.8 |
|  | 10 hrs 270° C | 2.78 | >300 | 10.24 | 5.0 | 2.48 | 1.39 | 0.09 | 3.1 | 40 |
| 20 | not aged | | >300 | 13.75 | 10.7 | 1.11 | 0.61 | 1.7 | 3.5 | 1.4 |
|  | 10 hrs 270° C | 2.54 | >300 | 12.01 | 12.0 | 2.06 | 1.28 | 0.62 | 3.3 | 7.5 |
| 21 | not aged | | >300 | 11.33 | 8.8 | 1.90 | 0.84 | 0.76 | 3.1 | 3.5 |
|  | 10 hrs 270° C | 3.12 | >300 | 12.26 | 8.6 | 3.34 | 1.71 | 0.34 | 3.3 | 15 |

*These values were determined at 240° C.

EXAMPLE 23

The procedure is analogous to Example 1 but with the following differences. A mixture of 0.5 mol of o,o'-diallyl-bisphenol A and 0.25 mol of o-allylphenol is employed in place of 1 mol of DABA. In the first stage the product is heated to 175° C and not to 150° C for 6 hours; the 2nd stage corresponds to that in Example 1.

Test values for the castings obtained according to Example 22 after these have been aged at 270° C (aged for several days) are summarized in Table 3.

Table 3

| Ageing | Loss in weight % by weight | Flexural strength kg/mm² | Absorption of cold water % by weight | Absorption of hot water % by weight |
|---|---|---|---|---|
| 3 days/270° C | 1.92 | 12.62 | 2.29 | 1.12 |
| 10 days/270° C | 2.98 | 9.32 | 2.57 | 1.39 |
| 20 days/270° C | 4.10 | 8.55 | 2.70 | 1.46 |
| 40 days/270° C | 5.80 | 6.88 | 2.87 | 1.30 |
| 80 days/270° C | 8.84 | 6.07 | 3.19 | 1.77 |

What is claimed is:

1. A process for the manufacture of a crosslinked polymer containing imide groups comprising reacting at a temperature of 20° to 250° C
(a) a polyimide of the formula

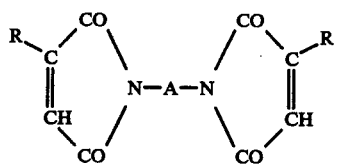

wherein
R is hydrogen or methyl, and A is a divalent radical of the formula

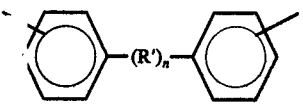

in which $R^1$ is selected from the group consisting of
—$CH_2$—;

—$SO_2$—, —SO—, —S— and —O—, and $n$ is 0 or 1; or
a polyimide selected from the group consisting of the N,N'-bis-maleimide of 4,4'-diamino-triphenyl phosphate, the N,N'-bis-maleimide of 4,4'-diamino-triphenyl phosphate, the N,N',N''-tris-maleimide of tris-(4-aminophenyl) phosphate and the N,N',N''-tris-maleimide of tris-(4-aminophenyl) thiophosphate; or a mixture of said polyimides; with (b) an alkenylphenol selected from the group consisting of o,o'-diallyl-bisphenol A, 4,4'-dihydroxy-3,3'-diallyldiphenyl, bis-(4-hydroxy-3-allylphenyl)methane, 2,2-bis-(4-hydroxy-3,5-diallylphenyl)propane, eugenol, o,o'-dimethallyl-bisphenol A, 4,4'-dihydroxy-3,3'-dimethylallyldiphenyl, bis-(4-hydroxy-3-methallylphenyl)methane, 2,2-bis-(4-hydroxy-3,5-dimethallylphenyl)-propane and 4-methallyl-2-methoxyphenol; or
an alkenylphenol ether selected from the group consisting of 2,2-bis(4-methoxy-3-allylphenyl)propane, 2,2-bis(4-methoxy-3-methallyphenyl)propane, 4,4'-dimethoxy-3,3'-diallyldiphenyl, 4,4'-dimethoxy-3,3'-dimethallyldiphenyl, bis(4-methoxy-3-allyl-phenyl)methane, bis(4-methoxy-3-methallyl-phenyl)methane, 2,2-bis(4-methoxy-3,5-diallylphenyl)propane, 2,2-bis-(4-methoxy-3,5-dimethallylphenyl)propane, 4-allylveratrole and 4-methallyl-veratrole; or a mixture of said alkenylphenols, a mixture of said alkenylphenol ethers or a mixture of said alkenylphenols and said alkenylphenol ethers;

in such molar proportion that for each 1 equivalent of polyimide component (a) there is from 0.1 to 10 moles of alkenylphenol, alkenylphenol ether or mixture thereof as component (b).

2. Process according to claim 1, characterised in that the reaction is allowed to proceed at a temperature of 100° to 250° C.

3. Process according to claim 1, characterised in that the polyimide employed is 4,4'-bis-maleimidodiphenylmethane.

4. Process according to claim 1, characterised in that the alkenylphenol or alkenylphenol ether employed is eugenol or eugenol methyl ether.

5. Process according to claim 1, characterised in that the alkenylphenol employed is o,o'-diallyl-bisphenol A.

6. Process according to claim 5, characterised in that a bis-maleimide is reacted with o,o'-diallyl-bisphenol A.

7. A process according to claim 1 wherein the reaction of the polyimide component (a) and the alkenylphenol, alkenylphenol ether or mixture thereof component (b) is carried out in the presence of a polymerization catalyst selected from the group consisting of an ionic catalyst, a free-radical polymerization catalyst and a transition metal acetylacetonate, said catalyst being in a concentration of 0.1 to 10% by weight, based on the total amount of reactants.

8. Process according to claim 7, characterised in that the polymerisation catalyst employed is an ionic catalyst.

9. Process according to claim 8, characterised in that the ionic catalyst employed is a tertiary, secondary or mixed tertiary/secondary amine or a quaternary ammonium compound.

10. Process according to claim 8, characterised in that the ionic catalyst employed is an alkali metal compound.

11. Process according to claim 7, characterised in that the polymerisation catalyst employed is a free-radical catalyst.

12. Process according to claim 11, characterised in that the free-radical catalyst employed is an organic peroxide.

13. Process according to claim 11, characterised in that the free-radical catalyst employed is azoisobutyronitrile.

14. Process according to claim 7, characterised in that the polymerisation catalyst employed is vanadium acetylacetonate.

15. Process according to claim 7, characterised in that a polymerisation catalyst is employed in a concentration of 0.1 to 5.0% by weight, based on the total amount of the reactants.

16. A crosslinked polymer manufactured by the process according to claim 1.

17. A mixture of which is stable on storage and can be cured by the action of heat which comprises
(a) a polyimide of the formula

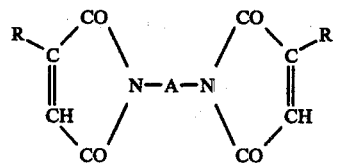

wherein
R is hydrogen or methyl, and
A is a divalent radical of the formula

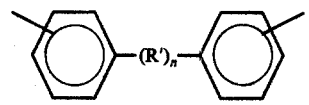

in which $R^1$ is selected from the group consisting of —CH$_2$—,

—SO$_2$—, —SO—, —S— and —O—, and $n$ is 0 or 1; or
a polyimide selected from the group consisting of the N,N'-bis-maleimide of 4,4'-diamino-triphenyl phosphate, the N,N'-bis-maleimide of 4,4'-diaminotriphenyl phosphate, the N,N',N''-tris-maleimide of tris-(4-aminophenyl) phosphate and the N,N',N''-tris-maleimide of tris-(4-aminophenyl) thiophosphate; or a mixture of said polyimides; and (b) an alkenylphenol selected from the group consisting of o,o'-diallyl-bisphenol A, 4,4'-dihydroxy-3,3'-diallyldiphenyl, bis-(4-hydroxy-3-allylphenyl)methane, 2,2-bis-(4-hydroxy-3,5-diallylphenyl)propane, eugenol, o,o'-dimethallyl-bisphenol A, 4,4'-dihydroxy-3,3'-dimethallyldiphenyl, bis-(4-hydroxy-3-methallylphenyl)methane, 2,2-bis-(4-hydroxy-3,5-dimethallylphenyl)propane and 4-methallyl-2-methoxyphenol; or an alkenylphenol ether selected from the group consisting of 2,2-bis(4-methoxy-3-allylphenyl)propane, 2,2-bis(4-methoxy-3-methallyl-phenyl)propane, 4,4'-dimethoxy-3,3'-diallyldiphenyl,4,4'-dimethoxy-3,3'-dimethyallyldiphenyl, bis(4-methoxy-3-allylphenyl)methane, bis(4-methoxy-3-methallylphenyl)methane, 2,2-bis-(4-methoxy-3,5-diallylphenyl)propane, 2,2-bis-(4-methoxy-3,5-dimethallylphenyl)propane, 4-allylveratrole and 4-methallyl-veratrole; or a mixture of said alkenylphenols, a mixture of said alkenylphenol ethers or a mixture of said alkenylphenols and said alkenylphenol ethers;

in such molar proportion that for each 1 equivalent of polyimide component (a) there is from 0.1 to 10 moles of alkenylphenol, alkenylphenol ether or mixture thereof as component (b).

18. A mixture according to claim 17, characterised in that it contains, as the polyimide, 4,4'-bis-maleimidodiphenylmethane.

19. A mixture according to claim 17, characterised in that it contains, as the alkenylphenol or alkenylphenol-ether, eugenol or eugenol methyl ether.

20. A mixture according to claim 17, characterised in that it contains, as the alkenylphenol, o,o'-diallyl-bisphenol A.

21. A mixture according to claim 20, characterised in that it contains a bis-maleimide and o,o'-diallyl-bisphenol A.

22. A mixture according to claim 17 which additionally contains, in a concentration of 0.1 to 10% by weight, based on the total amount of the reactants, a polymerization catalyst selected from the group consisting of an ionic catalyst, a free-radical polymerization catalyst and a transition metal acetylacetonate.

23. A mixture according to claim 22, characterised in that it contains, as the polymerisation catalyst, an ionic catalyst.

24. A mixture according to claim 23, characterised in that it contains, as the ionic catalyst, a tertiary, secondary or mixed tertiary/secondary amine or a quaternary ammonium compound.

25. A mixture according to claim 23, characterised in that it contains, as the ionic catalyst, an alkali metal compound.

26. A mixture according to claim 22, characterised in that it contains, as the polymerisation catalyst, a free-radical catalyst.

27. A mixture according to claim 26, characterised in that it contains, as the free-radical catalyst, an organic peroxide.

28. A mixture according to claim 26, characterised in that it contains, as the free-radical catalyst, azoisobutyronitrile.

29. A mixture according to claim 22, characterised in that it contains, as the polymerisation catalyst, vanadium acetylacetonate.

30. A mixture according to claim 22, characterised in that it contains a polymerisation catalyst in a concentration of 0.1 to 5.0% by weight, based on the total amount of the reactants.

31. A mixture according to claim 17, characterised in that it contains the polyimide (a) and the alkenylphenol or alkenylphenol ether (b) in the form of the prepolymer.

32. A mixture according to claim 17, characterised in that it is a casting resin mixture.

33. A process according to claim 1 wherein for each 1 equivalent of polyimide component (a) there is from 0.25 to 1 mole of alkenylphenol, alkenylphenol ether or mixture thereof as component (b).

34. A mixture according to claim 17 wherein for each 1 equivalent of polyimide component (a) there is from 0.25 to 1 mole of alkenylphenol, alkenylphenol ether or mixture thereof as component (b).

* * * * *